United States Patent
Inoue et al.

(10) Patent No.: US 9,346,027 B2
(45) Date of Patent: May 24, 2016

(54) PLANETARY MIXER

(75) Inventors: Masakazu Inoue, Tokyo (JP); Seiji Nagai, Atsugi (JP); Tomoharu Kawahara, Yokohama (JP)

(73) Assignee: INOUE MFG., INC. (JP)

( * ) Notice: Subject to any disclaimer, the term of this patent is extended or adjusted under 35 U.S.C. 154(b) by 0 days.

(21) Appl. No.: 14/349,493

(22) PCT Filed: May 28, 2012

(86) PCT No.: PCT/JP2012/063600
§ 371 (c)(1),
(2), (4) Date: Apr. 3, 2014

(87) PCT Pub. No.: WO2013/179365
PCT Pub. Date: Dec. 5, 2013

(65) Prior Publication Data
US 2015/0231579 A1  Aug. 20, 2015

(51) Int. Cl.
*B01F 7/00* (2006.01)
*B01F 7/30* (2006.01)
*B01F 3/12* (2006.01)
*A47J 43/07* (2006.01)

(52) U.S. Cl.
CPC .............. *B01F 7/30* (2013.01); *A47J 43/0711* (2013.01); *B01F 3/1271* (2013.01); *B01F 7/003* (2013.01); *B01F 7/00991* (2013.01); *B01F 2215/0036* (2013.01)

(58) Field of Classification Search
CPC ..... A47J 43/044; A47J 44/02; A47J 43/0711; B01F 7/00991
USPC ......... 366/129, 130, 341, 343, 200, 309, 310, 366/312, 313, 325.4, 325.5, 325.6, 325.7, 366/325.8, 325.9, 325.91, 325.94
See application file for complete search history.

(56) References Cited

U.S. PATENT DOCUMENTS 5,150,968 A * 9/1992 Inoue ............................. 366/288
6,652,137 B1  11/2003 Bosch et al. ................... 366/288

FOREIGN PATENT DOCUMENTS

| JP | 45 27504 | 10/1970 |
|---|---|---|
| JP | 2000262881 | 9/2000 |
| JP | 2005279356 | 10/2005 |
| JP | 2010099553 | 5/2010 |

OTHER PUBLICATIONS

International Search Report mailed Jun. 26, 2012 issued in International Appln. No. PCT/JP2012/063600.

* cited by examiner

*Primary Examiner* — Tony G Soohoo
*Assistant Examiner* — Anshu Bhatia
(74) *Attorney, Agent, or Firm* — Adams & Wilks

(57) ABSTRACT

A planetary mixer has stirring blades that undergo planetary motion within a tank in close proximity to an inner wall of the tank for stirring solid/liquid type treatment materials received by the tank. Each of the stirring blades includes a vertical side portion having two slope faces slanting toward the inner wall of the tank, an edge face connecting outward front ends of the slope faces, and an inner face connecting inward front ends of the slope faces. The outward front ends are disposed closer to the tank inner wall than are the inward front ends, with a distance between the inward front ends being greater than a distance between the outward front ends. The inner face is formed in the shape of an arc having a center located at an intersection of a line interconnecting the inward front ends and centerline running through a center of the edge face.

13 Claims, 3 Drawing Sheets

PLANETARY MIXER

BACKGROUND OF THE INVENTION

1. Field of the Invention

The present invention relates to a planetary mixer which is used in various fields such as chemistry, medicines, electronics, ceramics, foods and feed, and in which stirring vanes formed into a frame shape (a frame-shaped blade) perform planetary motion in a tank (a vessel or a stirring tank), by which solid/liquid type treatment materials can be subjected to a treatment such as stirring, blending, mixing/kneading or kneading.

2. Background Information

Treatment operations such as stirring, blending, mixing/ kneading or kneading of solid/liquid type treatment materials of from a low viscosity to a high viscosity (up to 3,000 Pa·s) regardless of oiliness or aqueousness, have been mainly made in a batch system by a planetary mixer, for example, a bi-axial mixer (such as a mixer having two frame-shaped stirring blades), a tri-axial mixer (such as a mixer having three frame-shaped stirring blades, or a mixer having two frame-shaped stirring blades and one turbine blade in combination), or a quad-axial mixer (such as a mixer having two frame-shaped stirring blades and two turbine blades), in which plural frame-shaped stirring blades 1 perform revolution and rotation to move throughout a tank 2 as shown in FIG. 4. The frame-shaped stirring blade may usually have a structure wherein a substantially rectangular frame having a vertical side portion 3 and a horizontal side portion 4 is formed by rods having a cross section of substantially triangle shape (for example, reference may be made to Patent Document 1) and a cross section of substantially hexagonal shape (for example, reference may be made to Patent Document 2), and an edge face (an acute angle section) 7 formed by slope faces 5, 6 of the vertical side portion 3 is directed outwardly as seen from the center of the stirring blades, as shown in FIG. 5. When the frame-shaped stirring blade turns, the edge face 7 of the vertical side portion 3 comes close to the inner wall of the tank 2, and shearing stress is applied to treatment materials between the edge face and the inner wall of the tank to conduct the treatment such as a mixing/kneading operation. Accordingly, in the case of a batch system, the opportunity of applying the shearing stress to the materials between the frame-shaped stirring blade and the inner wall of tank (stirring tank) is non-continuous. In a mixing/kneading machine of which the frame-shaped stirring blade traces a planetary motion track, the opportunity is two times per one rotation of the frame-shaped stirring blade.

Observation will be made below about the powder at the time of charging which flows around the periphery of the vertical side portion of the frame-shaped stirring blade and between the vertical side portion and the inner wall of the tank, and the flow of the materials at the time of mixing/ kneading. As shown in FIG.5, firstly, when the vertical side portion 3 of the frame-shaped stirring blade 1 moves toward the arrow 8 in FIG. 5 (circumferential direction), a part of the materials in the tank is pressed by a forward side face 9 located at the front face side relative to the direction of movement of the vertical side portion 3 and made to flow in an outward direction (radial direction) along a forward slope face 5 at the front face side located next to the forward side face 9. The flowing materials which has reached the front end of the slope face 5 enters a gap 10 with the inner wall of the tank 2, and are then compressed between the inner wall of the tank and the edge face and the shearing stress is also applied thereto when the stirring blade turns to conduct stirring, blending, mixing/kneading, kneading, etc. The materials that have passed the gap 10 between the front end of the stirring blade and the inner wall of the tank are released from pressure, and expanded along a rearward slope face 6 at the rear face side relative to the direction of movement.

On the other hand, the materials which have blown against the forward side face 9 and not flowed in the direction towards the inner wall of the tank (radial direction) flow in a circumferential direction (tangential direction) by turning from the forward side face 9 of the vertical side portion 3 toward an inner side face 11 inwardly (rearward), and at this stage, a phenomenon wherein adhered (fixed) materials 13 of the treatment materials are formed is observed on the forward side face 9, inner side face 11 and rearward side face 12. Particularly, in the frame-shaped stirring blade 1, since the vertical side face 3 is formed to have a cross section of substantially triangle shape or substantially hexagonal shape so that the edge face (acute angle section) 7 formed by the slope faces 5, 6 faces outwardly as mentioned above, the inner face 11 forms a flat plane portion and both ends of the inner face 11 are connected continuously to the forward side face 9 and the rearward side face 12 via a right angle corner, respectively. Accordingly, along the flow of the materials flowing in the circumferential direction (tangential direction), negative pressure directed to the flat plane portion or stagnation phenomenon occurs, and as the results, the materials are drawn toward the corner of the inner face 11 and the rearward side face 12 and tend to adhere thereto as shown in FIG. 5.

As mentioned above, when the materials adhere (fix) to the frame-shaped stirring blades, it is required to stop the mixing/ kneading operation and scrape the adhered materials 13. This scraping operation is accompanied with dangers. If such scraping operation is not conducted, it becomes difficult to conduct homogeneous treatment. Particularly in a case of a treatment process including a step where the materials are subjected to strong kneading and then dilution, blob and lump are likely formed and the incorporation of lump, etc. during the dilution may cause failure of quality. Further, since such scraping operation is necessarily conducted halfway in the operation, the operation cannot be carried out continuously. Furthermore, since the tank cannot be tightly closed until completion of the scraping operation, in a case where a volatile organic solvent is used, problems of environmental pollution may sometimes be caused by diffusion of the solvent.

PRIOR ART REFERENCES

Patent Documents

Patent Document 1: Utility Model Publication No. 45-27504 (scope of claims for utility model registration and FIG. 4)
Patent Document 2: JP-A-2010-99553 (FIG. 2 to FIG. 5)

It is the object of the present invention to provide a planetary mixer in which, a frame-shaped stirring vane (frame-shaped blade) is moved in a planetary motion in a tank to carry out a treatment such as dispersion, stirring, blending, mixing/ kneading or kneading as mentioned above, wherein the inner face of the frame of the frame-shaped stirring blade to which the materials tend to adhere, are designed not to allow the materials to adhere or fix thereto; and for which no scraping halfway in the operation is needed, the treatment time for mixing/kneading, kneading or the like can be shortened, and no formation of blob and lump is caused.

In order to solve the above problems, the present invention provides a frame-shaped stirring blade having a vertical side portion with a cross section formed to have a slope face slanting against the inner wall of the tank as mentioned above, wherein the inner face of the frame of the frame-shaped stirring blade is formed to have a shape on which the materials can smoothly flow, by which improvement of flow is caused for the materials and adhesion and fixing of the materials to the stirring blade can be prevented.

The present invention provides a planetary mixer in which solid/liquid type treatment materials are subjected to dispersion, blending, mixing/kneading or the like by plural stirring blades which revolve or rotate in a tank, wherein the stirring blades are frame-shaped stirring blades of which the frame is formed by a vertical side portion and a horizontal side portion, and the vertical side portion has a cross-sectional configuration which has two slope faces slanting toward an inner wall of the tank so that the inward front ends are located far apart from the inner wall of the tank and the outward front ends are located near the inner wall of the tank, in which the distance between the inward front ends is broader than the distance between the outward front ends; an edge face connecting outward front ends of the slope faces; and an inner face connecting inward front ends of the slope faces, wherein the inner face is formed in an arcuate configuration, by which the above problems can be solved.

SUMMARY OF THE INVENTION

Further, the width of the vertical side portion of the frame-shaped stirring blades attributes to the flow of the materials in the circumferential direction (tangential direction) in the tank, and if the width is too narrow, the amount of movement of the materials becomes low, and if the width is too broad, the amount of movement of the materials in the circumferential direction becomes high, by which the materials unfavorably turn together with the frame-shaped stirring blades. As a result, it becomes impossible to securely conduct the stirring and mixing/kneading operations of the materials and to shorten the mixing/kneading time.

The present invention may also provide a planetary mixer wherein the width d from the edge face to the inner face of the vertical side portion of the frame-shaped stirring blades is adjusted to be 0.145 to 0.3 relative to the diameter D of the frame-shaped stirring blades, by which it is possible to securely conduct stirring and mixing/kneading of the materials.

Further, the edge portion of the vertical side portion of the frame-shaped stirring blades is a section which compresses the materials in the gap with the inner wall of tank and also exerts a shearing stress when the edge face comes closest to the inner wall of tank, and therefore if the width of the gap with the inner wall is too small as if it becomes a linear form, compression and expansion operations of the materials in the flow direction are hardly seen and the treatment time for homogeneous mixing/kneading is unfavorably long. On the other hand, if the width of the gap is too broad, the close contact area with the inner wall of tank becomes large, by which the shearing stress becomes large, but the heat generation becomes large and a large driving force against the load is needed, such being undesirable for mixing/kneading.

Accordingly, the present invention may also provide a planetary mixer wherein the width b of the edge face of the vertical side portion of the frame-shaped stirring blades is adjusted to be 4 to 15% of the width W between the inward front ends of the slope faces, by which it is possible to conduct the stirring or mixing/kneading operation of the materials efficiently in a short period of time.

In the above planetary mixer, it is also important to take into consideration a slant angle (wedging angle of materials) $\theta 1$ of the forward slope face, a slant angle (negative pressure angle) $\theta 2$ of the rearward slope face and a pincer angle (edge angle) $\theta$ between the outward front ends of the two slope faces in the vertical side portion of the frame-shaped stirring blades. If the edge angle $\theta$ is less than 80°, the materials move mainly in the circumferential direction, and the shearing stress generated in the gap with the inner wall of tank becomes low. On the other hand, if it is higher than 100°, wedging amount of the materials into the gap with the inner wall of tank becomes low, and the mixing/kneading time becomes long.

Accordingly, the present invention also provides a planetary mixer wherein the pincer angle $\theta$ between the outward front ends of the slope faces is adjusted to be 80 to 100° and the slant angle of the outward front end of each slope face slanting against the inner wall of tank is adjusted to be 40 to 50°, by which the materials can be efficiently kneaded, compression and expansion operations are effectively repeated in the flowing direction of materials, and the treatment can be conducted in a short period of time.

In the above planetary mixer, if the thickness (width) of the vertical side portion of the frame-shaped stirring blades is too large relative to the diameter of the stirring blades, in a case of a high viscosity material or a dilatant material, contact between the stirring blades each other or contact between the stirring blades and the inner wall of tank has been observed at the time of stirring or mixing/kneading. Accordingly, the present invention also provides a planetary mixer wherein the width (thickness) W between the inward front ends of the slope faces of the vertical side portion of the frame-shaped stirring blades is adjusted to be 0.2±0.05 relative to the diameter D of the frame-shaped stirring blades, in order to prevent interference between the stirring blades.

The present invention is constituted as mentioned above, namely, in the planetary mixer, solid/liquid type treatment materials are subjected to dispersion, stirring, mixing/kneading or the like by plural stirring blades which revolve and rotate in a tank, wherein the stirring vanes are frame-shaped stirring blades of which the frame is formed by a vertical side portion and a horizontal side portion, and the vertical side portion has a cross-sectional configuration which has two slope faces slanting toward an inner wall of the tank, an edge face connecting outward front ends of the slope faces to each other, and an inner face connecting inward front ends of the slope faces. The inward front ends are located far from the inner wall of the tank and the outward front ends are located near the inner wall of the tank. The distance between the inward front ends is broader than the distance between the outward front ends. The inner face is formed in an arcuate configuration. By this constitution, when the frame-shaped stirring blades revolve and rotate in the tank, the edge face of the vertical side portion of the frame-shaped stirring blades turns and comes close to the inner wall of tank, and the materials flowing along the forward slope face toward the inner wall of tank are fed into the gap between the edge face and the inner wall of tank and compressed, and at the same time, subjected to stirring, mixing/kneading or the like by the shearing stress generated with turn, and then are expanded along the rearward slope face. On the other hand, the materials flowing from the inward front end of the forward slope face toward the inside (rearward side) of the frame of the frame-shaped stirring blades, move toward the inner face connecting the inward front faces of the slope faces. Since this inner face is formed to have an arcuate configuration, the materials flow without formation of stagnation, improvement of flow is caused along the inner face, and treatments can be made without conventionally observed phenomenon in that the materials adhered or fixed to the inner face, forward slope face and rearward slope face. Accordingly, it is no longer needed to conduct an operation of scraping the adhered or fixed materials from the stirring blades halfway in the operation as conventionally practiced, and safety can be secured. Further, it becomes possible to solve such a problem that the adhered materials, etc. fall and are incorporated into paste in the form of blob and lump, whereby paste with excellent properties can be produced in a short period of time without formation of blob or lump and improvement of operability can be realized to a great extent. In addition, since there is no longer needed to conduct a scraping operation in the treatment such as stirring or mixing/kneading, it is possible to conduct the operation continuously in such a state that the tank is tightly closed. Even with materials containing a volatile organic substance, problems of environmental pollution are not caused, and therefore the flowability can be improved even at the time of dilution, and homogeneity can be obtained early.

Further, in the planetary mixer of the present invention, when the width d from the edge face to the inner face in the vertical side portion of the frame-shaped stirring blades is adjusted to be 0.145 to 0.3, particularly preferably 0.15 to 0.25 relative to the diameter D of the frame-shaped stirring blades, the materials do not turn together with the frame-shaped stirring blades and can be flowed securely in the circumferential direction (tangential direction) and can be exactly fed to the gap with the inner wall of the tank by the forward slope face of the vertical side portion, by which it is possible to efficiently conduct stirring, mixing/kneading or the like.

Further, in the above planetary mixer, when the width b of the edge face of the vertical side portion of the frame-shaped stirring blades is adjusted to be 4 to 15%, preferably 6 to 12% of the width W between the inward front ends of the slope faces, the compression and expansion operations of the materials between the edge face and the inner wall of the tank in the flowing direction of the materials can be securely conducted. It thereby becomes possible to conduct homogeneous mixing/kneading operation in a short time, and the treatment can be conducted economically causing only a little heat generation of the materials and requiring no large driving force against the load. When the pincer angle (edge angle) between the outward front ends of the slope faces of the frame-shaped stirring blades is adjusted to be 80 to 100°, preferably 85 to 90°, and the slant angle of each slope face slanting against the inner wall of the tank is adjusted to be 40 to 50°, the materials can securely wedge into the gap between the inner wall of the tank and the edge face and it becomes possible to conduct a high-viscosity or semisolid state mixing/kneading (strong kneading). By the compression and expansion operations with the forward slope face and the rearward slope face, surface coating of the powder and granular material can be made with a small amount of liquid components, the mixing/kneading and dilution can be made efficiently and the operation time can be shortened.

Furthermore, in the present invention, when the width W between the inward front ends of the slope faces of the vertical side portion of the frame-shaped stirring blades is adjusted to be 0.2±0.05 relative to the diameter D of the frame-shaped stirring blades, the strength can be increased, interference between the stirring blades can be prevented, no contamination due to contact is seen, and excellent results can be obtained.

DETAILED DESCRIPTION OF THE PREFERRED EMBODIMENTS

Figure 1:
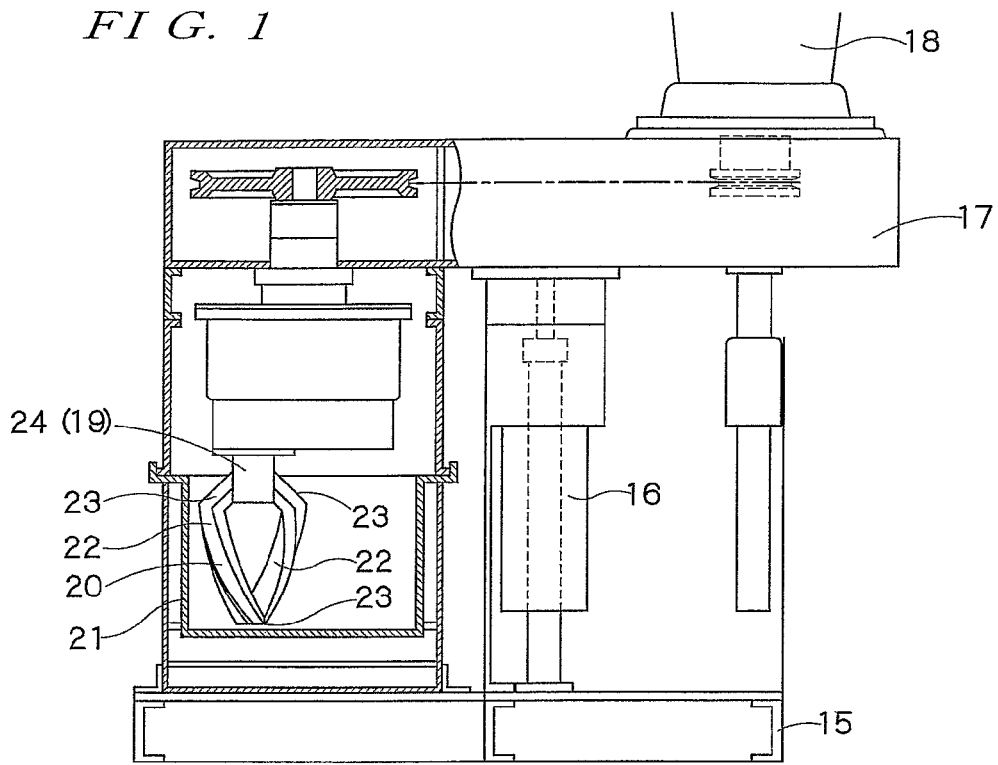
FIG. 1 is a partially cutaway front view showing an example of the present invention.
Figure 4:
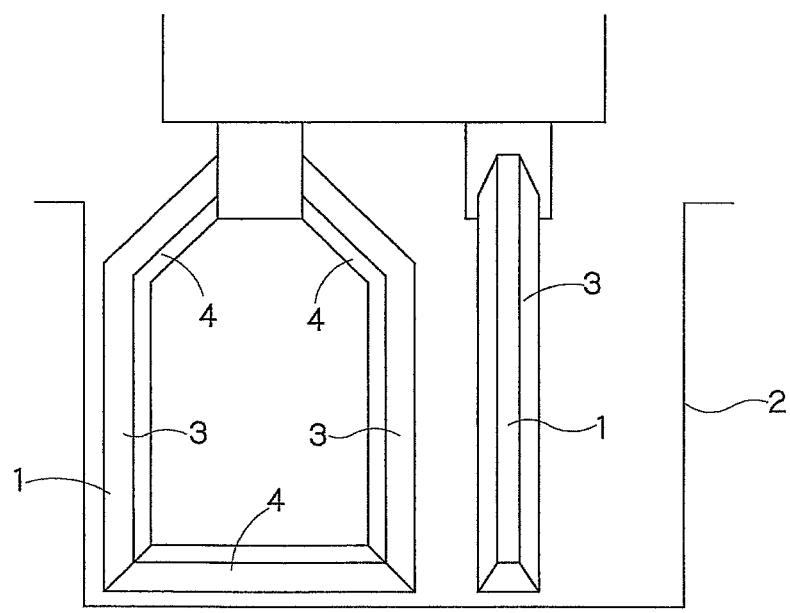
FIG. 4 is an explanatory view showing the constitution of the planetary mixer of the conventional frame-shaped blades.
Figure 5:
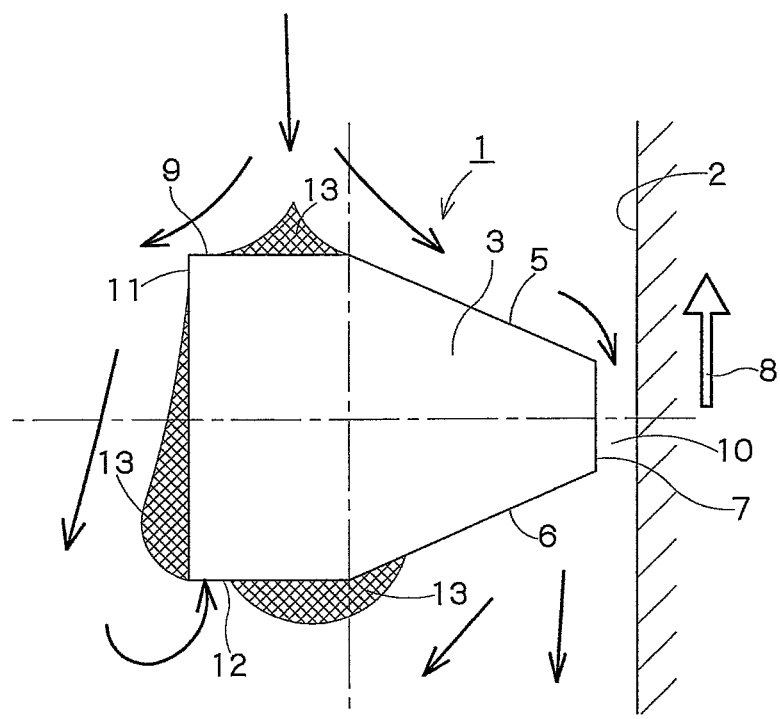
FIG. 5 is an explanatory view showing the action of the vertical side portion of a conventional frame-shaped stirring blade.

The planetary mixer of the present invention may be used for production steps of various products in the fields of chemistry, medicines, electronics, ceramics, foods, feed, etc. A main body 15 of the planetary mixer has a stirring head 17 which moves upward and downward by a lifting cylinder 16. A plurality of stirring shafts 19 perform revolution and rotation via a driving means such as a driving motor 18 disposed above the stirring head 17, by which a frame-shaped stirring vane (a frame-shaped blade) 20 disposed at the lower end of the stirring shaft performs planetary motion in a tank (vessel or stirring tank) 21 in its entirety. The frame-shaped stirring blade 20 is formed into a substantially rectangular frame shape, having a vertical side portion 22 and a horizontal side portion 23. The frame-shaped stirring blade may be a frame-shaped stirring blade as shown in FIG. 4 of which the horizontal side portion located at the upper side and the horizontal side portion located at the lower side are arranged to face in the same direction, or a frame-shaped twisted stirring blade of which the directions of the upper side and the lower side are different with a predetermined angle, for example, 45° or 90°. In the example shown in FIG. 1, a frame-shaped twisted stirring blade is shown.

Figure 2:
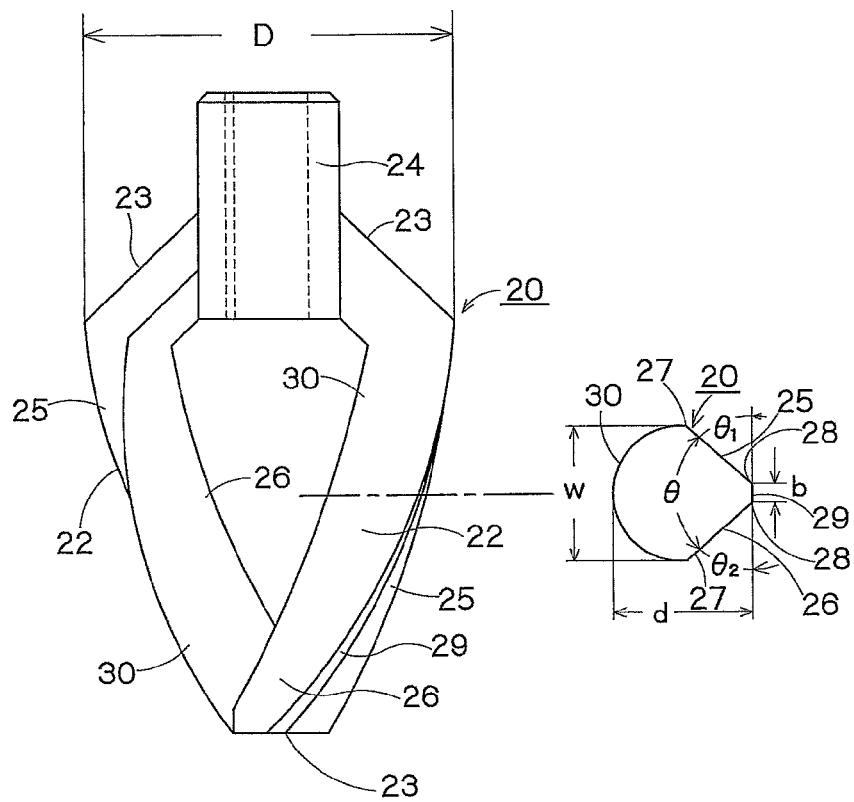
FIG. 2 is a front view showing a frame-shaped stirring blade of the present invention and an explanatory view showing a vertical side portion thereof.

As shown in FIG. 2, the frame-shaped stirring blade 20 has a connection cylinder 24 which is connected to a stirring shaft 19 on the upper portion of the frame; a horizontal side portion 23 at the upper part is connected continuously to the connection cylinder 24; an upper end of the vertical side portion 22 is connected continuously to the outward end of the horizontal side portion; the vertical side portion 22 extends downwardly in a twisted configuration; and a horizontal side portion 23 at the lower part which extends in a direction different by 90° from the horizontal side portion 23 at the upper part is connected continuously to the lower end of the vertical side portion 22.

Figure 3:
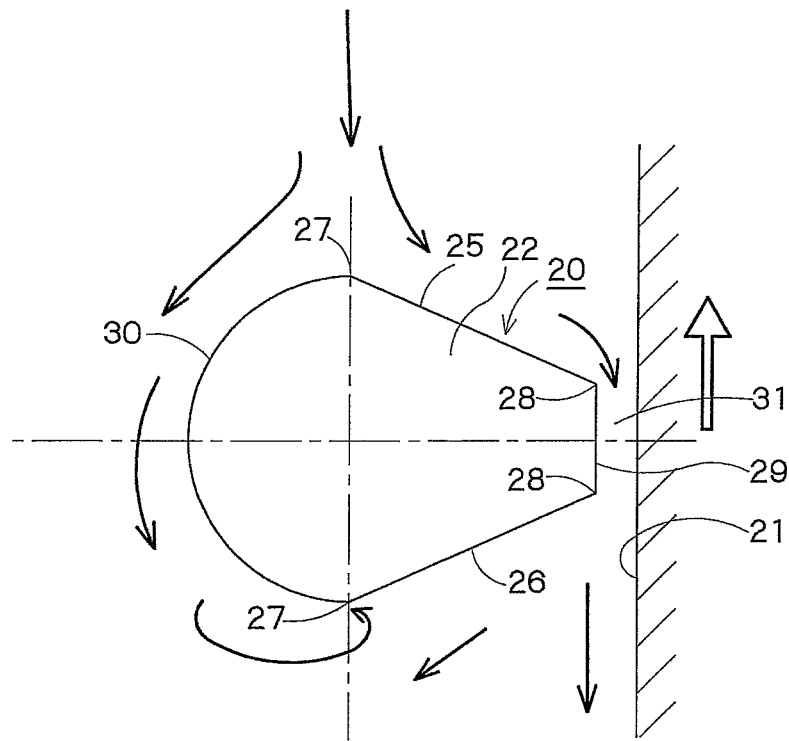
FIG. 3 is an explanatory view showing the action of the vertical side portion of the frame-shaped stirring blade of the present invention.

As shown in FIG. 2, the cross sectional shape of the vertical side portion 22 of the frame-shaped stirring blade 20 has a forward slope face 25 and a rearward slope face 26 which are facing each other. The slope faces 25, 26 slant against the inner wall of tank so that, with respect to the distance between the slope faces facing each other, the distance at the inner side of the frame i.e. the distance between the inward front ends 27 at the side being far apart from the inner wall of the tank 21 is broad and the distance between the outward front ends 28 at the side being close to the inner wall of tank is narrow. The outward front ends 28 are connected via an edge face 29, and when the frame-shaped stirring blade turns, the edge face 29 passes in close range to the inner wall of the tank 21. Between the inward front ends 27, an inner face 30 is provided continuously, and this inner face 30 is formed in an arcuate shape. As the arcuate-shaped face, in the example shown in FIG. 2, an arc is formed so that the center is located at the intersection of a line connecting the inward front ends 27 and a center line running the center of the edge face 29 as shown in FIG. 3, but the arc may have a center located on the center line and shifted toward the edge face from the intersection, or it may have other appropriate smooth curved faces such as oval.

Further, in the vertical side portion 22 of the frame-shaped stirring blade, the width d from the edge face 29 to the outer edge of the inner face 30 is adjusted to be about 0.145 to 0.3, particularly preferably about 0.15 to 0.25 relative to the diameter D of the frame-shaped stirring blade 20. The width (thickness) b of the edge face 29 is adjusted to be about 4 to 15%, preferably about 6 to 12% of the width (thickness) W between the inward front ends 27. The pincer angle (edge angle) θ between the slope faces 25, 26 is adjusted to be about 80 to 100°, preferably about 85 to 90°. The slant angle (wedging angle of materials) θ1 of the forward slope face 25 and the slant angle (negative pressure angle) δ2 of the rearward slope face 26 are adjusted to be about 40 to 50°. Further, the width (thickness) W between the inward front ends 27 is adjusted to be about 0.2±0.05 relative to the diameter D of the frame-shaped stirring blade 20.

The planetary mixer is used for various applications as described above. In usual, the treatment materials are subjected to a so-called "powder blending" when the materials are supplied, and then a small amount of a liquid component is added to the obtained powder and granular material to conduct a surface treatment of the powder and granular material. This step is powder blending and also a step of deactivating the activated powder and granular material and shredding agglomerates. In the next step, a small amount of a liquid component is further added, strong kneading is conducted by a high shearing operation with a high viscosity, and finally the product is diluted and taken out in the form of paste. Since it has been known that the shearing stress is represented by the product of the material's viscosity and the shearing rate and a high shearing stress can be obtained by the strong kneading with a high viscosity, it is preferred to conduct the strong kneading as described above.

The materials are subjected to strong kneading by a planetary mixer as mentioned above. In order not to cause deterioration of properties by heat generation of the paste at the time of mixing/kneading, it is preferred to conduct the operation under such conditions that the turning speed is about 0.5 to 1.5 m/sec and the temperature is at most about 60° C., for the following reason. When the turning speed is 1.5 m/sec or higher, the heat is overly generated, and from the aspect of material properties, it becomes difficult to keep the material temperature at 60° C. or lower.

The process as described above from the charge of material powder to the dilution to form paste was carried out by use of the frame-shaped stirring blade of the present invention, using a tri-axial planetary mixer having a tank capacity of 15 liters, manufactured by INOUE MFG., Inc. As shown in FIG. 3, when the frame-shaped stirring blade 20 revolved and rotated, every time when the edge face 29 came close to the inner wall of the tank 21, the materials flowing from the forward slope face 25 of the stirring blade toward the edge face 29 were entered into a gap 31 between the edge face 29 and the inner wall of the tank 21, and were compressed and sheared, and then expanded at the rearward slope face 26, whereby dispersion, blending, mixing/kneading, kneading or the like was efficiently conducted. On the other hand, the materials which flowed into the inside of the fame through the forward slope face 25 of the frame-shaped stirring blade were flowed along the curved inner face 30 without causing backwater. The improvement of flow made it possible to avoid the adhesion or fixing of materials to the inner face of the frame that have been conventionally seen, and no operation for scraping by workers was needed.

EXPLANATION OF SYMBOLS

15 Main body
20 Frame-shaped stirring blade
21 Tank
22 Vertical side portion
23 Horizontal side portion
25 Forward slope face
26 Rearward slope face
27 Inward front end
28 Outward front end
29 Edge face
30 Inner face

The invention claimed is:

1. A planetary mixer in which solid/liquid type treatment materials are subjected to dispersion, blending, or mixing/kneading, the planetary mixer comprising: a plurality of frame-shaped stirring blades configured to undergo revolving and rotating motion within a tank, each of the frame-shaped stirring blades having a vertical side portion and a horizontal side portion, the vertical side portion having a cross-sectional configuration with two slope faces slanting toward an inner wall of the tank so that inward front ends of the slope faces are located far apart from the inner wall of the tank and outward front ends of the slope faces are located near the inner wall of the tank and with a distance between the inward front ends being greater than a distance between the outward front ends, an edge face connecting the outward front ends of the slope faces, and an inner face connecting the inward front ends of the slope faces, the inner face being formed in the shape of an arc having a center located at an intersection of a line connecting the inward front ends and a centerline running through a center of the edge face.

2. The planetary mixer according to claim 1, wherein for each of the frame-shaped stirring blades, a width from the edge face to the inner face is 0.145 to 0.3 relative to a diameter of the frame-shaped stirring blade.

3. The planetary mixer according to claim 1, wherein for each of the frame-shaped stirring blades, a width of the edge face is 4 to 15% of a width between the inward front ends of the slope faces.

4. The planetary mixer according to claim 1, wherein for each of the frame-shaped stirring blades, a pincer angle between the outward front ends of the slope faces is 80 to 100° and a slant angle of the outward front end of each of the slope faces slanting against the inner wall of the tank is 40 to 50°.

5. The planetary mixer according to claim 1, wherein for each of the frame-shaped stirring blades, a width between the inward front ends of the slope faces is 0.2±0.05 relative to a diameter of the frame-shaped stirring blade.

6. A planetary mixer comprising:
a tank configured to receive solid/liquid type treatment materials; and
a plurality of stirring blades configured to undergo planetary motion within the tank in close proximity to an inner wall of the tank for stirring solid/liquid type treatment materials received by the tank, each of the stirring blades including a vertical side portion having two slope faces slanting toward the inner wall of the tank, an edge face connecting outward front ends of the slope faces, and an inner face connecting inward front ends of the slope faces, the outward front ends being disposed closer to the inner wall of the tank than the inward front ends, a distance between the inward front ends being greater than a distance between the outward front ends, and the inner face being formed in the shape of an arc having a center located at an intersection of a line interconnecting the inward front ends and centerline running through a center of the edge face.

7. The planetary mixer according to claim 6, wherein each the stirring blades comprises frame-shaped stirring blade.

8. The planetary mixer according to claim 6, wherein each the stirring blades comprises a frame-shaped twisted stirring blade.

9. The planetary mixer according to claim 6, wherein each of the stirring blades has a connection cylinder connected to a stirring shaft at an upper part of the stirring blade, a first horizontal side portion disposed at the upper part and connected to the connection cylinder, and a second horizontal side portion disposed at a lower part of the stirring blade and extending in a direction different from that of the first horizontal side portion; and wherein the vertical side portion has an upper end connected to an outward end of the first horizontal side portion and a lower end connected to the second horizontal side portion.

10. The planetary mixer according to claim 6, wherein for each of the stirring blades, a distance from the edge face to the inner face is from 0.145 to 0.3 of a diameter of the stirring blade.

11. The planetary mixer according to claim 6, wherein for each of the stirring blades, a width of the edge face is from 4% to 15% of a distance between the inward front ends of the sloped faces.

12. The planetary mixer according to claim 6, wherein for each of the stirring blades, a pincer angle between the outward front ends of the sloped faces is from 80° to 100° and a slant angle of the outward front end of each of the sloped faces slanting against the inner wall of the tank is from 40° to 50°.

13. The planetary mixer according to claim 6, wherein for each of the stirring blades, a distance between the inward front ends of the sloped faces is 0.2±0.05 of a diameter of the stirring blade.

* * * * *